US009193569B2

(12) United States Patent
Shimizu

(10) Patent No.: US 9,193,569 B2
(45) Date of Patent: Nov. 24, 2015

(54) BALUSTRADE DEVICE FOR CONVEYOR

(75) Inventor: Takumi Shimizu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/382,399

(22) PCT Filed: Mar. 19, 2012

(86) PCT No.: PCT/JP2012/057036
§ 371 (c)(1),
(2), (4) Date: Sep. 2, 2014

(87) PCT Pub. No.: WO2013/140504
PCT Pub. Date: Sep. 26, 2013

(65) Prior Publication Data
US 2015/0122612 A1 May 7, 2015

(51) Int. Cl.
*B65G 23/22* (2006.01)
*B66B 23/22* (2006.01)

(52) U.S. Cl.
CPC .................................... *B66B 23/22* (2013.01)

(58) Field of Classification Search
None
See application file for complete search history.

(56) References Cited

U.S. PATENT DOCUMENTS 4,488,631 A * 12/1984 Courson ...................... 198/335
4,690,264 A 9/1987 Adrian et al.
5,307,919 A 5/1994 Wente et al.
5,542,522 A 8/1996 Adrian et al.

FOREIGN PATENT DOCUMENTS

| | | | |
|---|---|---|---|
| CN | 201198432 | Y | 2/2009 |
| JP | 60-213686 | | 10/1985 |
| JP | 6-329378 | | 11/1994 |
| JP | 7-25572 | | 1/1995 |
| JP | 7-17337 | | 3/1995 |
| JP | 7-277649 | | 10/1995 |
| JP | 2001-206668 | | 7/2001 |
| JP | 2011-88704 | | 5/2011 |

OTHER PUBLICATIONS

International Search Report issued Jun. 12, 2012, in PCT/JP12/057036 filed Mar. 19, 2012.
Combined Office Action and Search Report issued May 11, 2015 in Chinese Patent Application No. 201280071554.X (with English translation and English translation of Category of Cited Documents).

* cited by examiner

*Primary Examiner* — Kavel Singh
(74) *Attorney, Agent, or Firm* — Oblon, McClelland, Maier & Neustadt, L.L.P.

(57) ABSTRACT

A balustrade device for a conveyor includes at least a holder body, a clamping component assembled to the holder body, and a clamping force applying mechanism. The clamping component has a panel-side pressing surface, and the clamping force applying mechanism has a clamping force action axis intersecting, in vertical cross-sectional view, with the panel-side pressing surface or a plane extending from the panel-side pressing surface. Thus, a high gripping force can be generated in spite of a two-dimensional shape of the balustrade device.

5 Claims, 19 Drawing Sheets

BALUSTRADE DEVICE FOR CONVEYOR

TECHNICAL FIELD

The present invention relates to a balustrade device for a conveyor.

BACKGROUND ART

Structures for holding a balustrade panel of a passenger conveyor, in particular, structures for fixing a glass are required to grip the glass with a sufficient force so as to prevent displacement of the glass due to the gravity, passengers' tampering, or collision of objects.

As a glass holding structure that satisfies the above-mentioned requirement, there are known a structure for causing an axial force of a bolt to directly act as a pressing force through an intermediation of a plate, and a structure for amplifying the pressing force on the wedge principle.

The first structure for pressing the plate may be simple but is required to cause the axial force of the bolt to act on the balustrade panel at a right angle, to thereby generate a necessary gripping force. As a result, there arise drawbacks such as increase in device size, material cost, and weight, and tightness in the internal space.

As the second structure, on the other hand, a structure disclosed in, for example, JP 07-17337 B is known. This structure attains light-weighting and space saving, but the shape of each component is relatively complex, and hence it is difficult to manufacture the component by sheet metal working. Further, a relatively accurate surface is required to slide the component, and hence the manufacturing method is limited to metal casting that involves machining, or to injection molding (die casting). As a result, there arise drawbacks such as increase in processing cost and investment in molds.

In contrast, JP 07-25572 A discloses a wedge-type glass holding structure manufactured by aluminum extrusion molding, which is lower in cost of molds than the die casting (generally 1/10 to 1/20).

However, the extrusion molding is limited to manufacture of components having two-dimensional shapes, and hence it is difficult to obtain a structure for generating a sufficient holding force. In actuality, the structure disclosed in JP 07-25572 A is more difficult in exerting a sufficient gripping force than the structure disclosed in JP 07-17337 B.

CITATION LIST

Patent Literature

[PTL 1] JP 07-17337 B
[PTL 2] JP 07-25572 A

SUMMARY OF INVENTION

Technical Problem

The present invention has been made in view of the above-mentioned circumstances, and it is therefore an object of the present invention to provide a balustrade device for a conveyor, which is capable of generating a high gripping force in spite of its two-dimensional shape.

Solution to Problem

In order to attain the above-mentioned object, according to one embodiment of the present invention, there is provided a balustrade device for a conveyor, including at least: a holder body; a clamping component assembled to the holder body; and a clamping force applying mechanism. The clamping component has a panel-side pressing surface, and the clamping force applying mechanism has a clamping force action axis intersecting, in vertical cross-sectional view, with the panel-side pressing surface or a plane extending from the panel-side pressing surface.

Advantageous Effects of Invention

According to one embodiment of the present invention, a high gripping force can be generated in spite of the two-dimensional shape.

DESCRIPTION OF EMBODIMENTS

Figure 1:
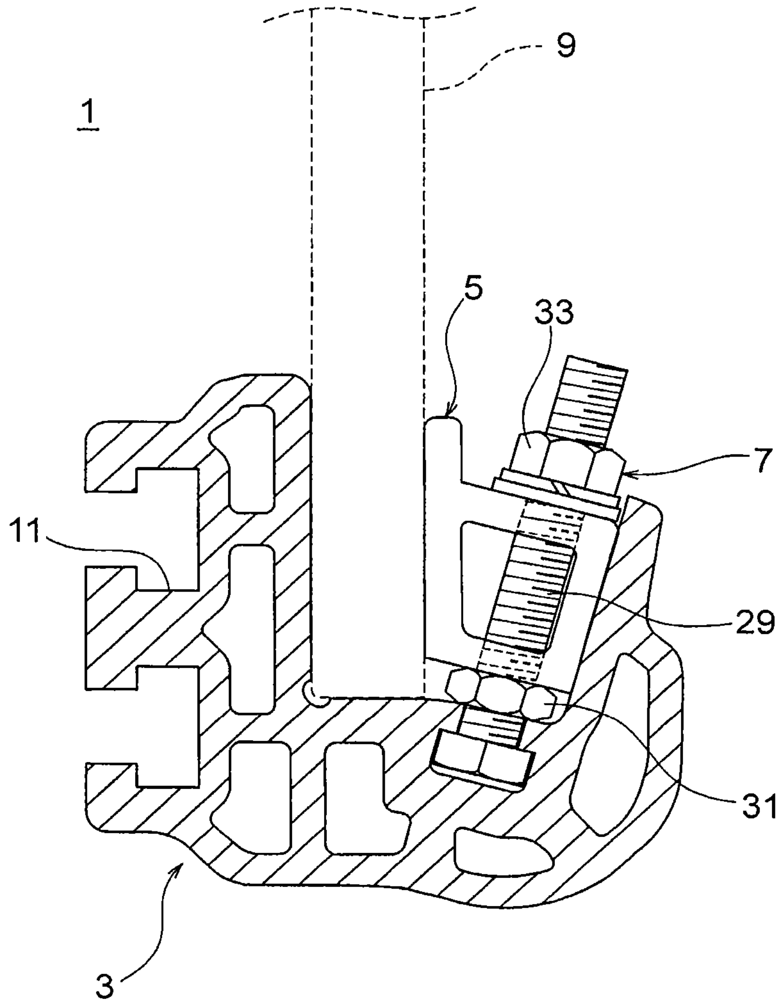
FIG. 1 is a vertical cross-sectional view illustrating an assembled state of a balustrade device for a passenger conveyor according to a first embodiment of the present invention.

Now, a balustrade device for a conveyor according to embodiments of the present invention is described with reference to the accompanying drawings. Note that, in the drawings, the same reference symbols represent the same or corresponding parts. Note that, in each of the following embodiments, a balustrade device for an escalator, which is one of the passenger conveyors, is described as the balustrade device for a conveyor.

First Embodiment

Figure 2:
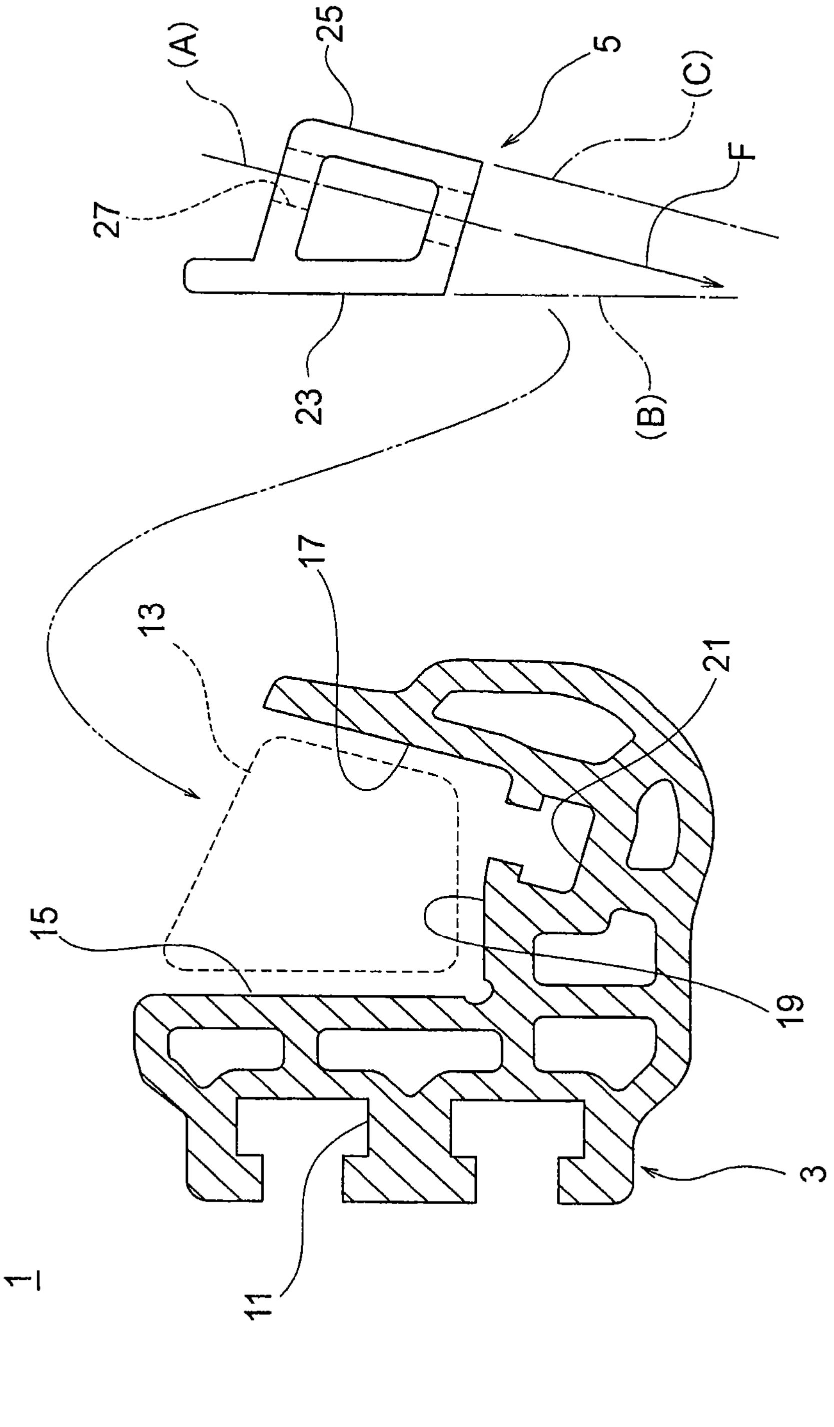
FIG. 2 is a vertical cross-sectional view illustrating a disassembled state of the balustrade device for a passenger conveyor of FIG. 1.

FIG. 1 is a vertical cross-sectional view illustrating an assembled state of a balustrade device for a passenger conveyor according to a first embodiment of the present invention. FIG. 2 is a vertical cross-sectional view illustrating a disassembled state of the balustrade device for a passenger conveyor of FIG. 1.

Note that, the vertical cross sections of the balustrade device illustrated in FIGS. 1 and 2 are cross sections orthogonal to a conveyance direction of the conveyor or cross sections taken in the vertical direction intersecting with the conveyance direction.

A balustrade device 1 for a passenger conveyor according to the first embodiment includes at least a panel holder including a holder body 3 and a clamping component 5, and a clamping force applying mechanism 7. In brief, the balustrade device 1 for a passenger conveyor is configured to sandwich a balustrade panel 9, such as a glass panel, between the holder body 3 and the clamping component 5, and to apply a necessary clamping force by the clamping force applying mechanism 7.

The holder body 3 has such a shape that an aluminum extruded product is sliced into a cross section at a predetermined length (about 60 mm to 120 mm). Note that, the length refers to a dimension in a direction orthogonal to the drawing sheet of FIG. 1. The balustrade device 1 for a conveyor is fixed to a truss structure (not shown) through an intermediation of a bracket (not shown). A groove 11, into which the bracket is to be coupled, is formed in a left side surface of the holder body 3 in the drawing sheet.

A recessed portion 13 for receiving the clamping component 5 is formed in an upper right region of the holder body 3 in the drawing sheet. In the vertical cross-sectional view of FIG. 2, the recessed portion 13 is a U-shaped or V-shaped groove. Further, in the vertical cross-sectional view of FIG. 2, the recessed portion 13 is defined by a panel receiving surface 15, a clamping component-side abutment surface 17, and a bottom surface 19, and is opened on an upper side of the recessed portion 13.

The panel receiving surface 15 and the clamping component-side abutment surface 17 have a relationship of being inclined with respect to each other so as to gradually reduce an interval therebetween toward the bottom surface 19 side. That is, the recessed portion 13 has such a cross-sectional shape that the space defined by the recessed portion 13 is gradually reduced toward the bottom surface 19 side.

At the time of clamping operation, the clamping component-side abutment surface 17 is configured to guide an advancing direction of the clamping component 5, and to receive a reaction force that the clamping component 5 receives from the balustrade panel 9. In the example of the first embodiment, the clamping component-side abutment surface 17 is inclined with respect to the panel receiving surface 15 by 10° to 30°.

A bolt fitting groove 21 for fitting a head of the bolt described later, which is a part of the clamping force applying mechanism 7, is formed in the bottom surface 19. Further, the bottom surface 19 is formed horizontally, and is orthogonal to the panel receiving surface 15, but the present invention is not limited thereto.

The clamping component 5 is an aluminum extruded product similarly to the holder body 3, and is larger in length dimension than the holder body 3 by about 10 mm to 20 mm. The clamping component 5 has a panel-side pressing surface 23 and a holder body-side abutment surface 25 at both side portions thereof. In the first embodiment, the holder body-side abutment surface 25 and the clamping component-side abutment surface 17 of the holder body 3 have a relationship of being brought into contact with and slidable with respect to each other. Further, the panel-side pressing surface 23 and the balustrade panel 9 have a relationship of being brought into contact with and slidable with respect to each other.

The panel-side pressing surface 23 and the holder body-side abutment surface 25 have a relationship of being inclined with respect to each other so as to gradually reduce an interval therebetween toward the bottom surface 19 side of the recessed portion 13. Further, a through hole (including a shape of cutouts) 27 for a shank of the bolt described later, which is a part of the clamping force applying mechanism 7, is formed in the clamping component 5. An axis (A) of the through hole 27 is positioned between the panel-side pressing surface 23 and the holder body-side abutment surface 25 in the drawing sheet of FIG. 2.

The clamping force applying mechanism 7 includes, for example, a bolt 29, a fixing nut 31, and a clamping force applying nut 33. Under a state in which a head of the bolt 29 is received in the bolt fitting groove 21, the fixing nut 31 is tightened so that the bolt 29 is fixed into the recessed portion 13. In addition, under a state in which the clamping component 5 is fitted onto a shank of the bolt 29, the clamping force applying nut 33 is tightened from above the clamping component 5 so as to cause the clamping component 5 to apply a clamping force.

A clamping force action axis F of the clamping force applying mechanism 7 intersects, in vertical cross-sectional view, with the panel-side pressing surface 23 or a plane (B) extending from the panel-side pressing surface 23. Note that, it is assumed that the intersection is limited to a state of intersection occurring on a distal end side of the arrow indicating the clamping force action axis F. In other words, the intersection refers to intersection occurring in a region below the clamping component 5 in the drawing sheet of FIG. 2.

Further, in the first embodiment, the clamping force action axis F of the clamping force applying mechanism 7 extends, in vertical cross-sectional view, between the panel-side pressing surface 23 (including the plane (B) extending from the panel-side pressing surface 23) and the holder body-side abutment surface 25 (including a plane (C) extending from the holder body-side abutment surface 25). Further, the axis (A) of the through hole 27, that is, the clamping force action axis F, the holder body-side abutment surface 25, and the plane (C) extending from the holder body-side abutment surface 25 are set to a parallel relationship.

The panel holder is configured to fix the balustrade panel 9 through a reliable operation using the clamping component 5 that utilizes the wedge principle. Further, the bolt 29 is fixed in parallel to the advancing direction of the clamping component 5, and the bolt fitting groove 21, the through hole 27, and the bolt 29 are provided so that the clamping force action axis F, the holder body-side abutment surface 25, and the plane (C) extending from the holder body-side abutment surface 25 become parallel to each other.

Next, description is given of excellent functions of the balustrade device for a conveyor according to the first embodiment, which is constructed as described above. Firstly, referring to FIG. 3, description is given of a clamping force to be generated in the structure disclosed in Patent Literature 2 (JP 07-25572 A) as a comparative example. Subsequently, referring to FIG. 4, description is given of a clamping force to be generated in the balustrade device for a conveyor according to the first embodiment.

Note that, the meanings of the symbols to be used in the following description are as follows.

F: clamping force action axis=tightening force (axial force) of bolt

P: reaction force (gripping force) received by clamping component from balustrade panel N: reaction force received by clamping component from holder body $\mu_1$: coefficient of friction between clamping component and holder body $\mu_2$: coefficient of friction between clamping component and balustrade panel θ: angle formed between panel receiving surface and clamping component-side abutment surface (advancing direction of clamping component)

Figure 3:
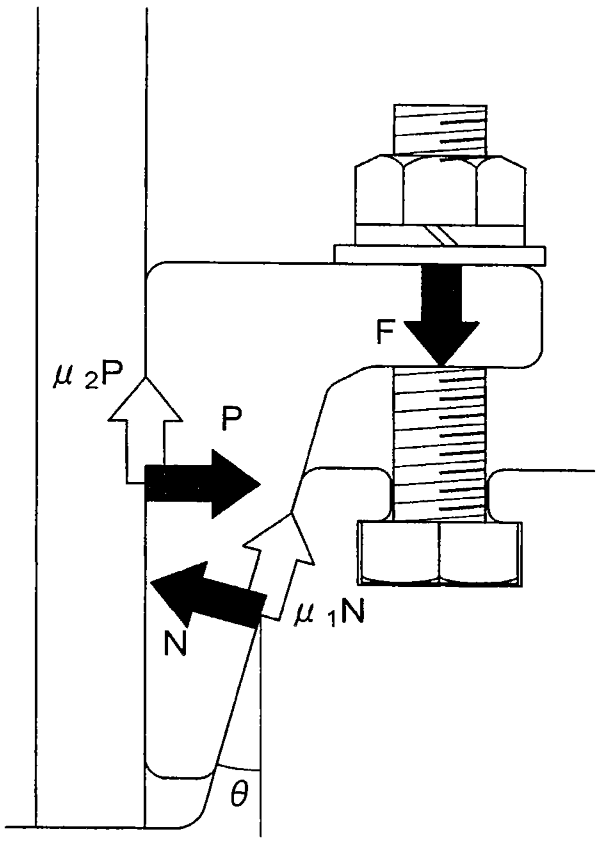
FIG. 3 is an explanatory view illustrating evaluation of a clamping force to be generated in a structure of a comparative example.

Firstly, as illustrated in FIG. 3, in the structure of the comparative example, the balance between the forces acting on the clamping component has the following relationships in terms of two axes orthogonal to each other.

[Math. 1]

$$P=N(\cos\theta-\mu_1\sin\theta) \tag{1}$$

[Math. 2]

$$\mu_2 P+N(\sin\theta+\mu_1\cos\theta)=F \tag{2}$$

When Expression (2) is transformed so that the reaction force N received by the clamping component from the holder body is expressed by the axial force F and the gripping force P, the following expression is obtained.

[Math. 3]

$$N=\frac{F-\mu_2 P}{\sin\theta+\mu_1\cos\theta} \tag{3}$$

When Expression (3) is then substituted into Expression (1) to eliminate the reaction force N, the following expression is obtained.

[Math. 4]

$$P=\frac{F-\mu_2 P}{\sin\theta+\mu_1\cos\theta}(\cos\theta-\mu_1\sin\theta) \tag{4}$$

Further, when Expression (4) is transformed so that the gripping force P is expressed by the axial force F, the following expression is obtained.

[Math. 5]

$$P=\frac{\cos\theta-\mu_1\sin\theta}{(1-\mu_1\mu_2)\sin\theta+(\mu_1+\mu_2)\cos\theta}F \tag{5}$$

When $\mu_1$, $\mu_2$, and θ in Expression (5) are changed to calculate multiplication factors for the axial force F with respect to the gripping force P under the respective conditions, the results are as shown in Table 1. Note that, for convenience of the calculation, it is assumed that $\mu_1=\mu_2=\mu$.

TABLE 1

| | θ | | | | |
|---|---|---|---|---|---|
| μ | 10° | 15° | 20° | 25° | 30° |
| 0 | 5.67 | 3.73 | 2.75 | 2.14 | 1.73 |
| 0.1 | 2.62 | 2.09 | 1.72 | 1.44 | 1.22 |
| 0.2 | 1.69 | 1.44 | 1.24 | 1.07 | 0.93 |
| 0.3 | 1.25 | 1.09 | 0.96 | 0.84 | 0.73 |
| 0.4 | 0.98 | 0.87 | 0.77 | 0.68 | 0.60 |
| 0.5 | 0.81 | 0.72 | 0.64 | 0.57 | 0.50 |
| 0.6 | 0.68 | 0.61 | 0.55 | 0.48 | 0.42 |
| 0.7 | 0.59 | 0.53 | 0.47 | 0.41 | 0.35 |
| 0.8 | 0.52 | 0.46 | 0.41 | 0.35 | 0.30 |

Figure 4:
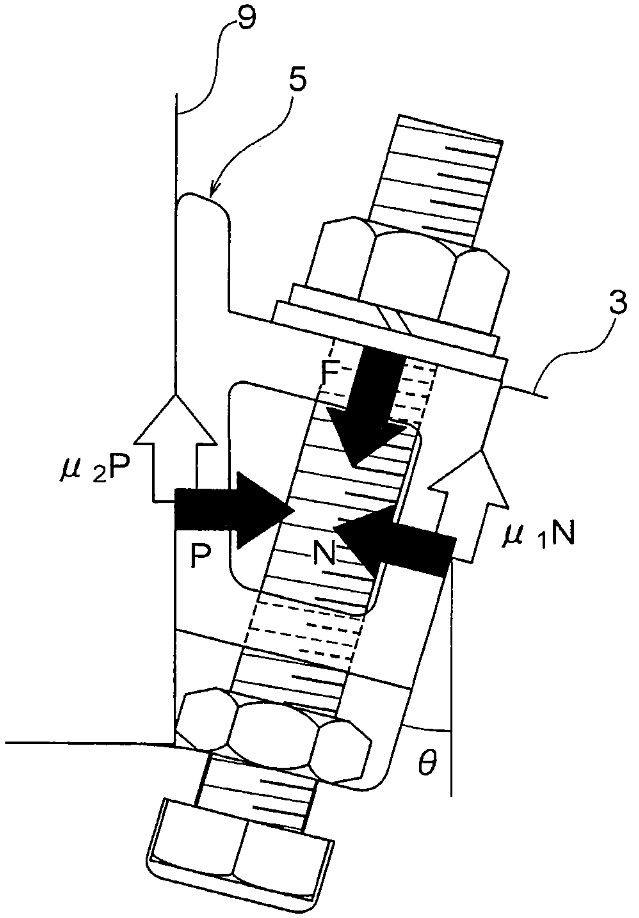
FIG. 4 is an explanatory view illustrating evaluation of a clamping force to be generated in the balustrade device for a conveyor according to the first embodiment of the present invention.

Similarly to the above, in the balustrade device for a conveyor according to the first embodiment, as illustrated in FIG. 4, the following two expressions are firstly obtained as the relationships for the balance between the forces.

[Math. 6]

$$P=F\sin\theta+N(\cos\theta-\mu_1\sin\theta) \tag{6}$$

[Math. 7]

$$N=P(\cos\theta-\mu_2\sin\theta) \tag{7}$$

When the reaction force N is then eliminated based on Expressions (6) and (7), the following expression is obtained.

[Math. 8]

$$P=F\sin\theta+P(\cos\theta-\mu_2\sin\theta)(\cos\theta-\mu_1\sin\theta) \tag{8}$$

Further, when Expression (8) is transformed so that the gripping force P is expressed by the axial force F, the following expression is obtained.

[Math. 9]

$$P=\frac{1}{(1-\mu_1\mu_2)\sin\theta+(\mu_1+\mu_2)\cos\theta}F \tag{9}$$

When $\mu(\mu_1=\mu_2=\mu)$ and θ in Expression (9) are similarly changed to calculate multiplication factors for the axial force F with respect to the gripping force P under the respective conditions, the results are as shown in Table 2.

TABLE 2

| | θ | | | | |
|---|---|---|---|---|---|
| μ | 10° | 15° | 20° | 25° | 30° |
| 0 | 5.76 | 3.86 | 2.92 | 2.37 | 2.00 |
| 0.1 | 2.71 | 2.23 | 1.90 | 1.67 | 1.50 |
| 0.2 | 1.78 | 1.58 | 1.42 | 1.30 | 1.21 |
| 0.3 | 1.34 | 1.23 | 1.14 | 1.08 | 1.03 |
| 0.4 | 1.07 | 1.01 | 0.96 | 0.93 | 0.90 |
| 0.5 | 0.90 | 0.86 | 0.84 | 0.82 | 0.81 |

TABLE 2-continued

| | θ | | | | |
|---|---|---|---|---|---|
| μ | 10° | 15° | 20° | 25° | 30° |
| 0.6 | 0.77 | 0.75 | 0.74 | 0.74 | 0.74 |
| 0.7 | 0.68 | 0.67 | 0.67 | 0.67 | 0.68 |
| 0.8 | 0.61 | 0.61 | 0.61 | 0.62 | 0.64 |

As is apparent from comparison between Tables 1 and 2, when the friction is ignored, for example, when μ=0 and θ=10°, P=5.67 F in the comparative example and P=5.76 F in the first embodiment, which exhibits no significant difference between the comparative example and the first embodiment. Under actual conditions that the friction cannot be ignored, it is understood that the influence of the friction is significant. Within a realistic range in which μ=0.4 to 0.8, in the related-art structure as in the comparative example, the gripping force is significantly attenuated with respect to the tightening force of the bolt, whereas in this embodiment, the tightening force is not significantly lost so that a gripping force of 120% to 200% as compared to the related-art structure can be generated.

As described above, according to the first embodiment, the inventive cross-sectional shape obtained by forming the clamping component-side abutment surface parallel to the wedge advancing direction, the bolt fitting groove, and the like is introduced in the extrusion molding. Thus, it is possible to attain a panel holding structure capable of generating a high holding force in spite of its shape limited to the two-dimensional shape due to the extrusion. Further, with the above-mentioned excellent effect, three-dimensional molding is unnecessary, which means that there is also attained an advantage in that the use of expensive molds is not required unlike aluminum die casting. Still further, the holder body and the clamping component are obtained by only slicing an extruded material into cross sections, and hence the productivity is also excellent significantly. Still further, the clamping component is longer than the holder body, and hence the clamping component slightly projects with respect to the holder body during assembly. This projecting state is utilized so that the clamping component can be removed from the holder body by applying a load to the projecting portion from below, with the result that the workability is enhanced.

Second Embodiment

Figure 5:
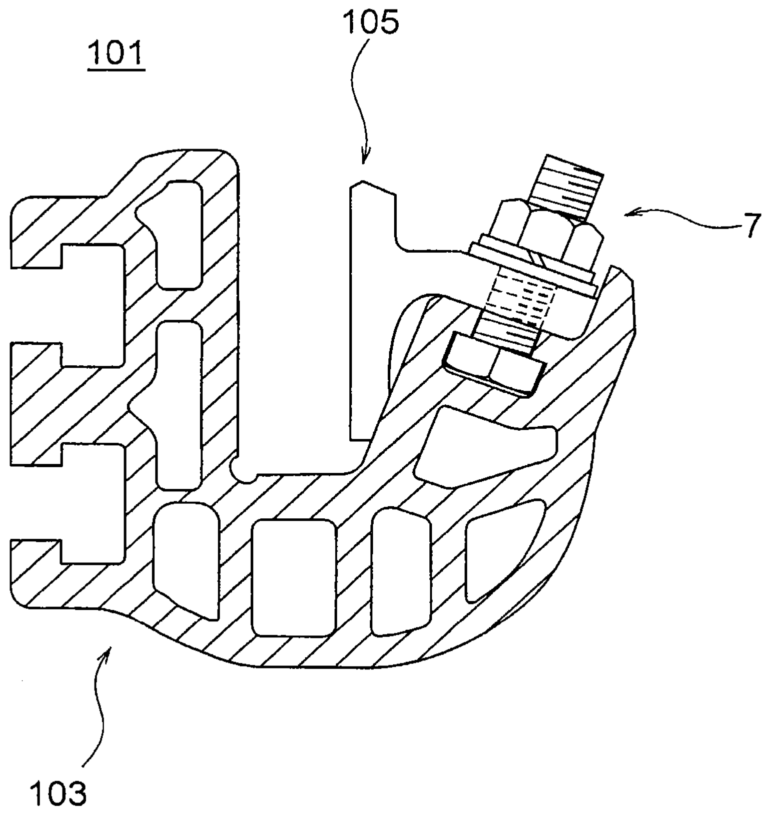
FIG. 5 is a view illustrating a second embodiment of the present invention in the same manner as that of FIG. 1.
Figure 6:
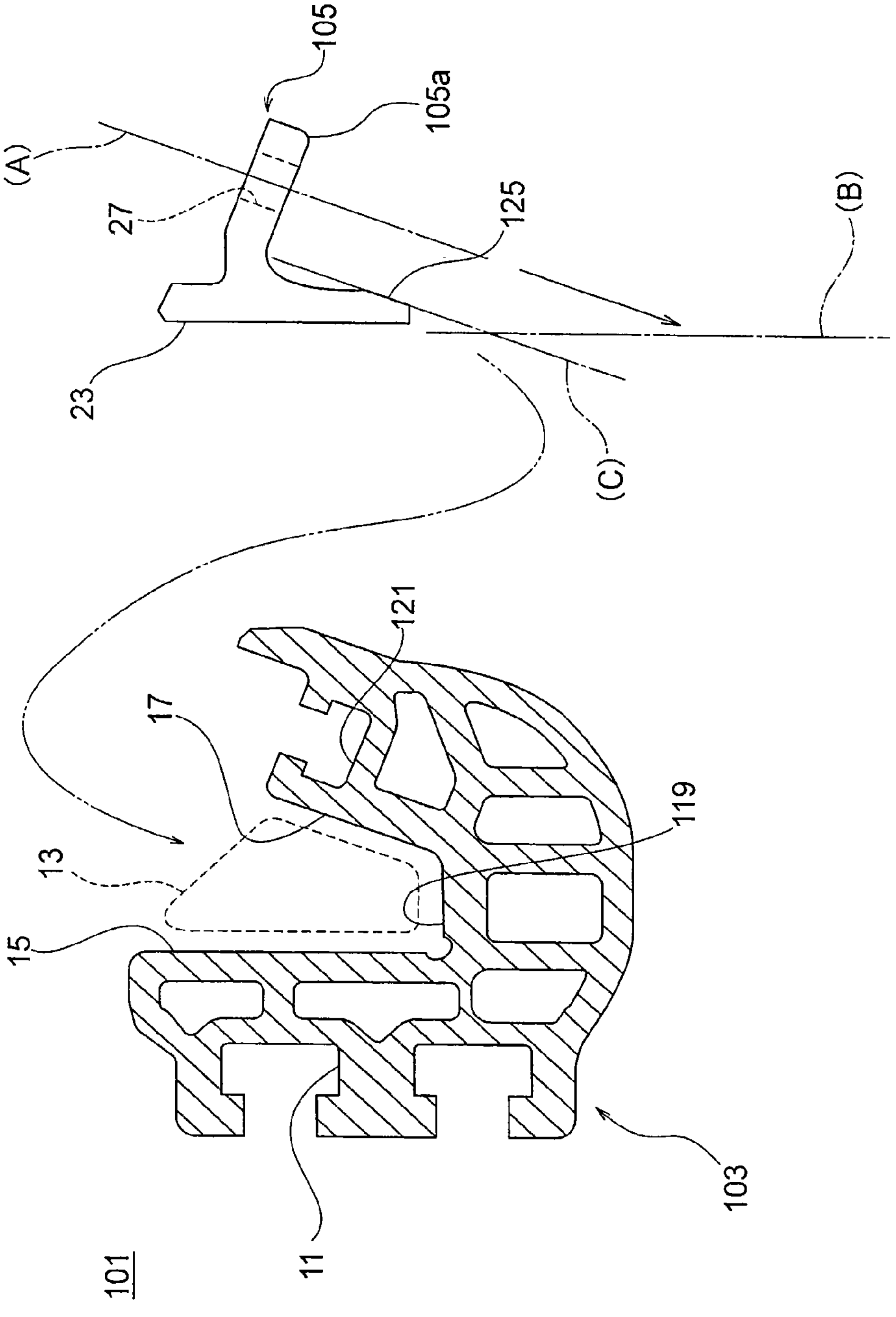
FIG. 6 is a view illustrating the second embodiment of the present invention in the same manner as that of FIG. 2.

Next, referring to FIGS. 5 and 6, a balustrade device for a conveyor according to a second embodiment of the present invention is described. FIGS. 5 and 6 are views illustrating the second embodiment in the same manners as those of FIGS. 1 and 2, respectively.

A holder body 103 of a balustrade device 101 for a conveyor according to the second embodiment has a bolt fitting groove 121 formed not in a bottom surface 119 of the recessed portion 13 but outside the recessed portion 13. Along with this, in a clamping component 5, the axis (A) of the through hole 27 is positioned outside a region defined between the plane (B) extending from the panel-side pressing surface 23 and a plane (C) extending from a holder body-side abutment surface 125.

Comparing the clamping component according to the second embodiment with the clamping component according to the first embodiment, it can be said that the clamping component according to the second embodiment has a shape in which a clamping force receiving portion 105*a* is extended so that the axis (A) of the through hole 27 is positioned outside the region defined between the plane (B) extending from the panel-side pressing surface 23 and the plane (C) extending from the holder body-side abutment surface 125. Alternatively, it can conversely be said that the clamping component according to the second embodiment has a shape in which the region of the clamping component 105 is reduced so that the holder body-side abutment surface 125 is brought closer to the panel-side pressing surface 23.

Also with the above-mentioned balustrade device 101 for a conveyor according to the second embodiment, similarly to the first embodiment, a high gripping force can be generated in spite of the two-dimensional shape.

Third Embodiment

Figure 7:
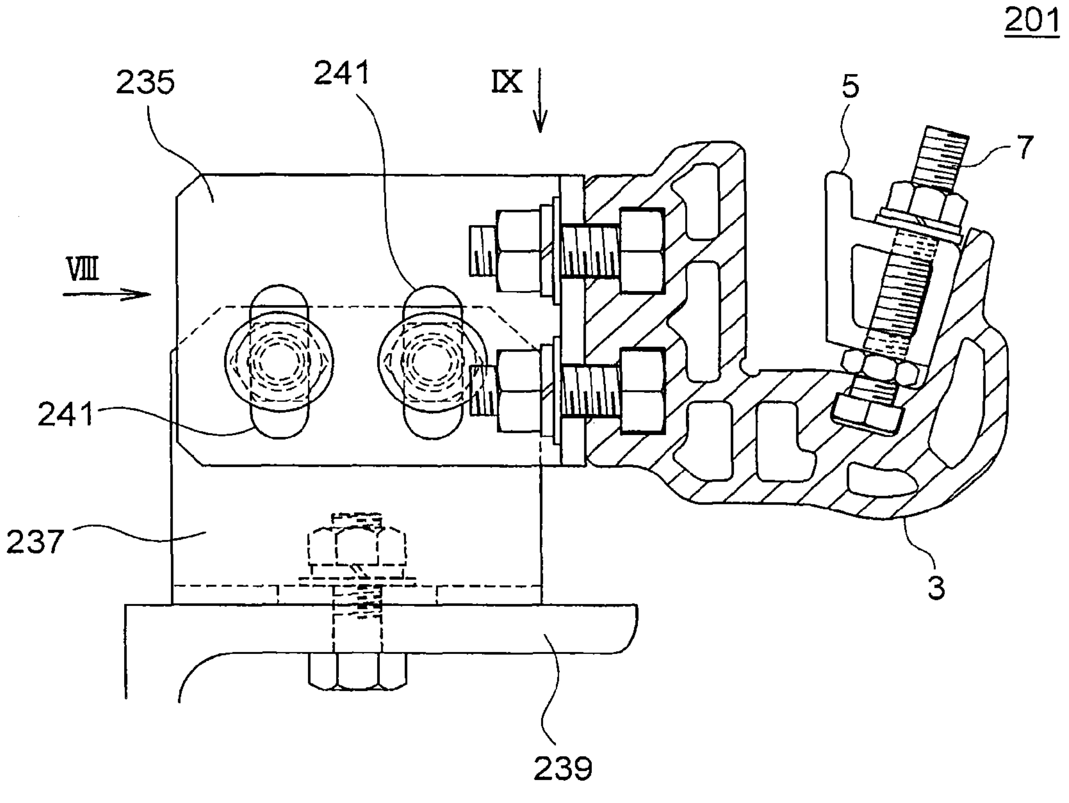
FIG. 7 is a view illustrating a third embodiment of the present invention in the same manner as that of FIG. 1.
Figure 8:
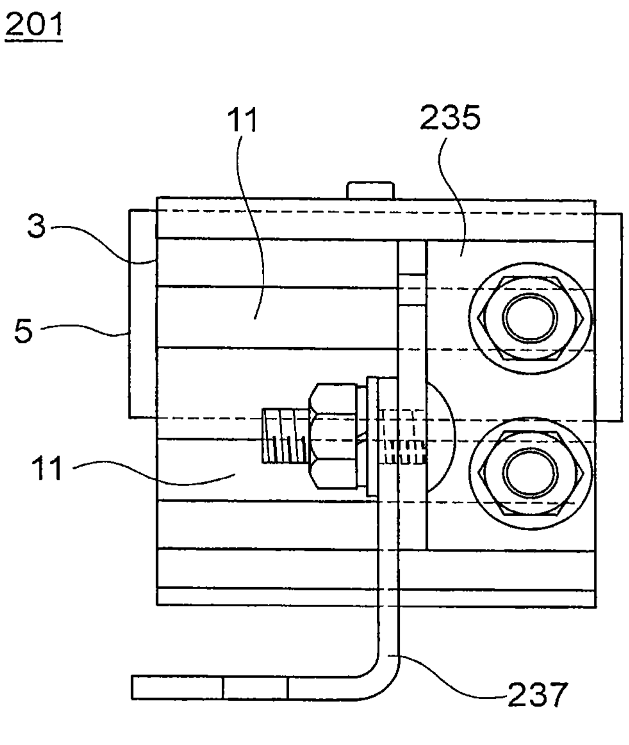
FIG. 8 is a view illustrating the structure of FIG. 7 as seen in a direction of the arrow VIII.
Figure 9:
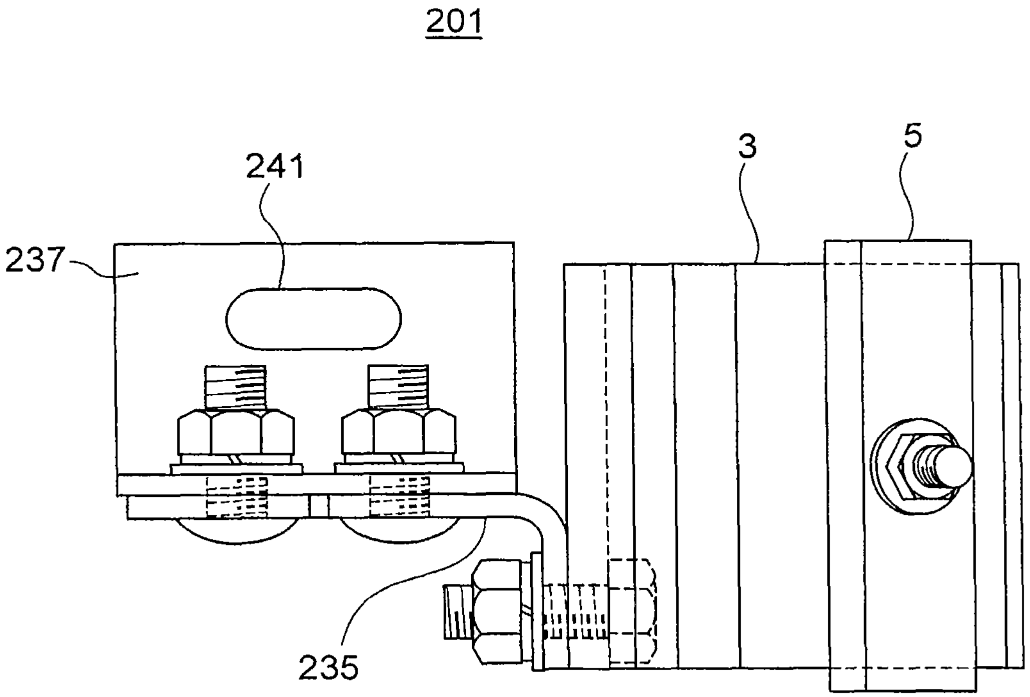
FIG. 9 is a view illustrating the structure of FIG. 7 as seen in a direction of the arrow IX.

Next, referring to FIGS. 7 to 11, a balustrade device for a conveyor according to a third embodiment of the present invention is described. FIG. 7 is a view illustrating the third embodiment in the same manner as that of FIG. 1. FIGS. 8 and 9 are views illustrating the structure of FIG. 7 as seen in directions of the arrows VIII and IX, respectively.

In a balustrade device 201 for a conveyor according to the third embodiment, a holder body having a clamping component and a clamping force applying mechanism assembled thereto is fixed to a truss structure (fixing member) 239 of the passenger conveyor through use of two brackets 235 and 237 in combination. Thus, the positioning work at the time of holding the balustrade panel is facilitated. Note that, the clamping component, the clamping force applying mechanism, and the holder body have the same structures as those in the above-mentioned first or second embodiment. In the example of FIGS. 7 to 11, the clamping component, the clamping force applying mechanism, and the holder body have the same structures as those in the first embodiment.

The brackets 235 and 237 are two sheet metal components each having, for example, an L-shaped end surface. The bracket to be connected to the holder body 3 is referred to as "adjusting bracket 235," and the bracket to be connected to the truss structure 239 is referred to as "mounting bracket 237." In some cases, brackets having the same dimensions may be used as the brackets 235 and 237.

A surface of the adjusting bracket 235, which is not fastened to the holder body 3, and a surface of the mounting bracket 237, which is not fastened to the truss structure 239, are fastened to each other through use of bolts serving as fasteners. The two brackets 235 and 237 are held by a frictional force generated due to axial forces of the bolts, and hence the size and number of the bolts only need to be selected based on an assumed external force.

At least one elongate hole 241 for adjusting the height and horizontal alignment position of the holder body 3 (horizontal direction in the drawing sheet of FIG. 9) is formed in the adjusting bracket 235 and/or the mounting bracket 237. For example, in the third embodiment, a plurality of the elongate holes 241 are formed in the mounting bracket 237 on a side connected to the truss structure 239, and in the adjusting bracket 235 on a side connected to the mounting bracket 237.

Further, the mounting structure is set so that the bolts are inserted into the respective elongate holes 241, and hence the structure is capable of adjusting slide and rotation between the two brackets 235 and 237 and between the mounting bracket 237 and the truss structure 239.

Due to the adjusting mechanism as described above, as a jig for adjusting the position of the holder body 3, a panel dummy, which is a plate having a thickness equal to that of the panel, may be arranged at an ideal panel position with respect to a reference position (rail for steps and truss).

Figure 10:
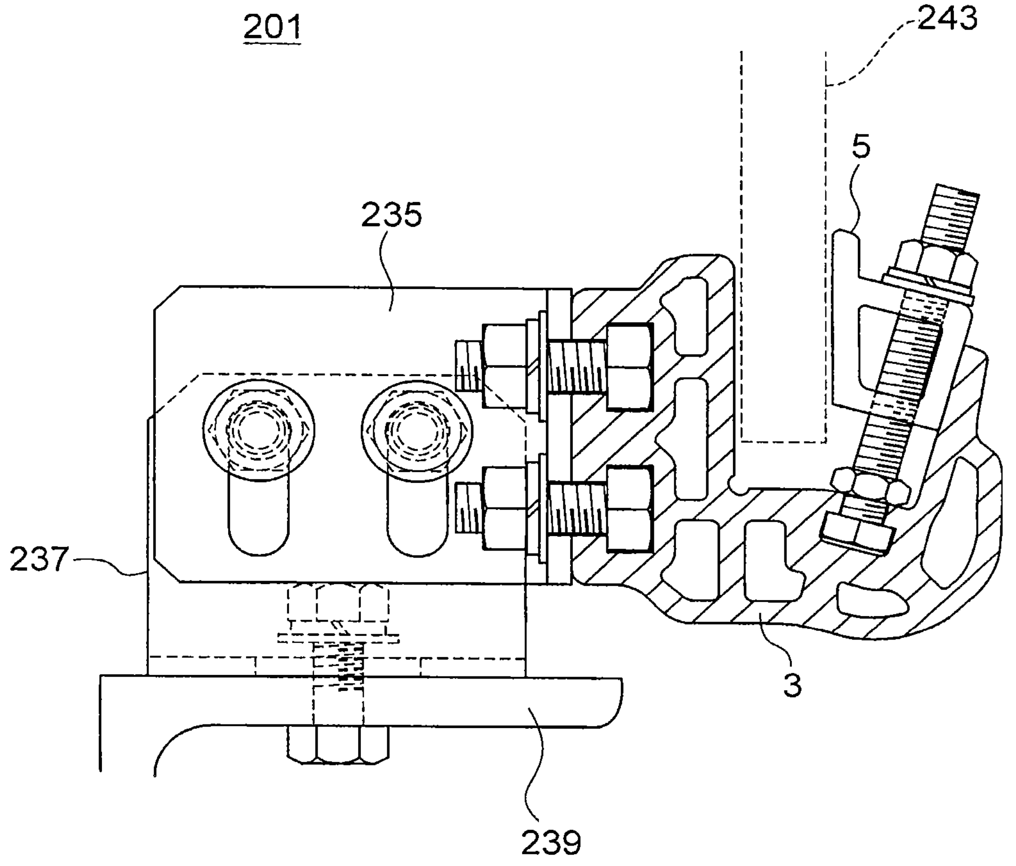
FIG. 10 is a view illustrating a procedure of assembling the balustrade device for a conveyor according to the third embodiment of the present invention.
Figure 11:
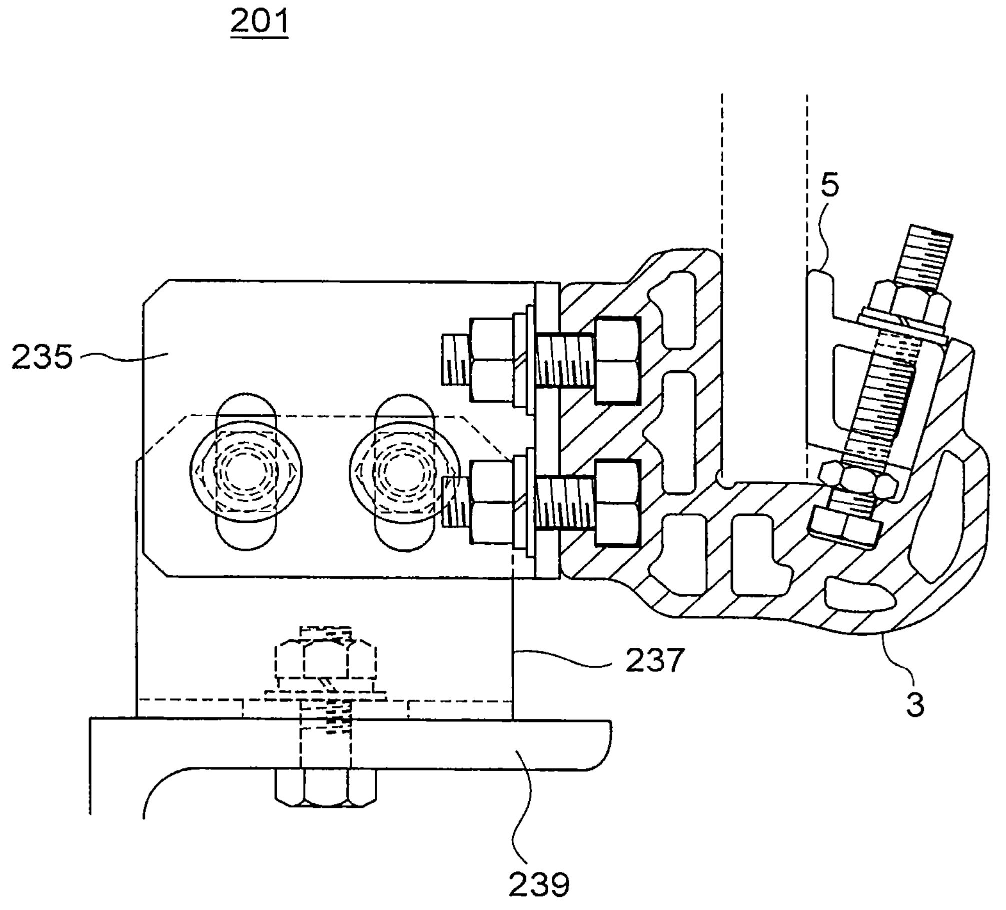
FIG. 11 is a view illustrating the procedure of assembling the balustrade device for a conveyor according to the third embodiment of the present invention.

Further, referring to FIGS. 10 and 11, description is given of a procedure of assembling the balustrade device for a conveyor according to the third embodiment. Firstly, as illustrated in FIG. 10, the adjusting bracket 235 is fixed to the holder body 3. The adjusting bracket 235 and the mounting bracket 237 are temporarily assembled to each other under a state in which the bolts are loosened, and the mounting bracket 237 and the truss structure 239 are also temporarily assembled to each other under a state in which the bolts are loosened.

Subsequently, through use of the adjusting jig, a panel dummy 243 is arranged at an ideal position (height, horizontal alignment, and inclination) with respect to the reference. Then, the clamping force applying mechanism 7 is operated so as to cause the clamping component 5 to apply a necessary clamping force, to thereby temporarily hold the panel dummy 243 in a similar state to an ideal holding state of the balustrade panel 9 to be intended.

In this state, the bolts temporarily tightened as described above are tightened appropriately so that the adjusting bracket 235 and the mounting bracket 237 are finally assembled to each other, and the mounting bracket 237 and the truss structure 239 are also finally assembled to each other. In this manner, the holder body 3 is finally fixed.

Then, the clamping force applying mechanism 7 is loosened so as to reduce the clamping force of the clamping component 5, to thereby remove the panel dummy 243. Thus, the holder body 3 remains in a state of being capable of holding the balustrade panel 9 in an ideal manner to be intended.

With the above-mentioned balustrade device for a conveyor according to the third embodiment, in addition to the above-mentioned functions of the first embodiment and/or the second embodiment, there is further attained an advantage of easily and highly accurately carrying out the positional adjustment of the panel fixing structure, which is necessary to highly accurately reproduce the horizontal alignment position, height, and verticality of the inner panel, at an assembly plant of the passenger conveyor or a building site.

Fourth Embodiment

Figure 12:
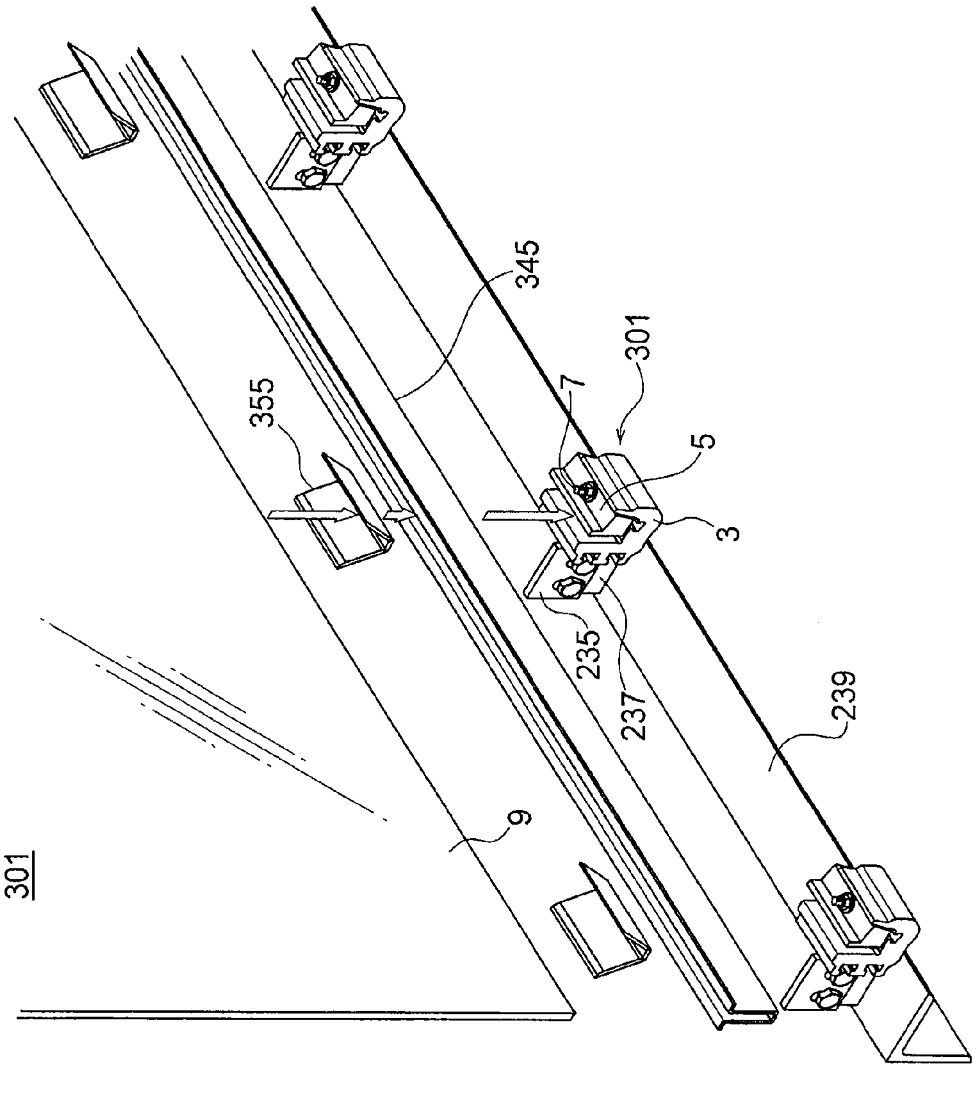
FIG. 12 is a schematic perspective view illustrating panel support through use of a balustrade device for a conveyor according to a fourth embodiment of the present invention.

Next, referring to FIGS. 12 to 18, a balustrade device for a conveyor according to a fourth embodiment of the present invention is described. FIG. 12 is a schematic perspective view illustrating panel support through use of a balustrade device 301 for a conveyor according to the fourth embodiment.

The balustrade device 301 for a conveyor according to the fourth embodiment includes a holder body supported by a fixing member through use of appropriate brackets, a clamping component, a clamping force applying mechanism, a rail-like component, and a cushioning member. Note that, as a specific example, the holder body 3, the clamping component 5, the clamping force applying mechanism 7, the adjusting bracket 235, and the mounting bracket 237 described above are used, and the fixing member is the truss structure 239.

Figure 13:
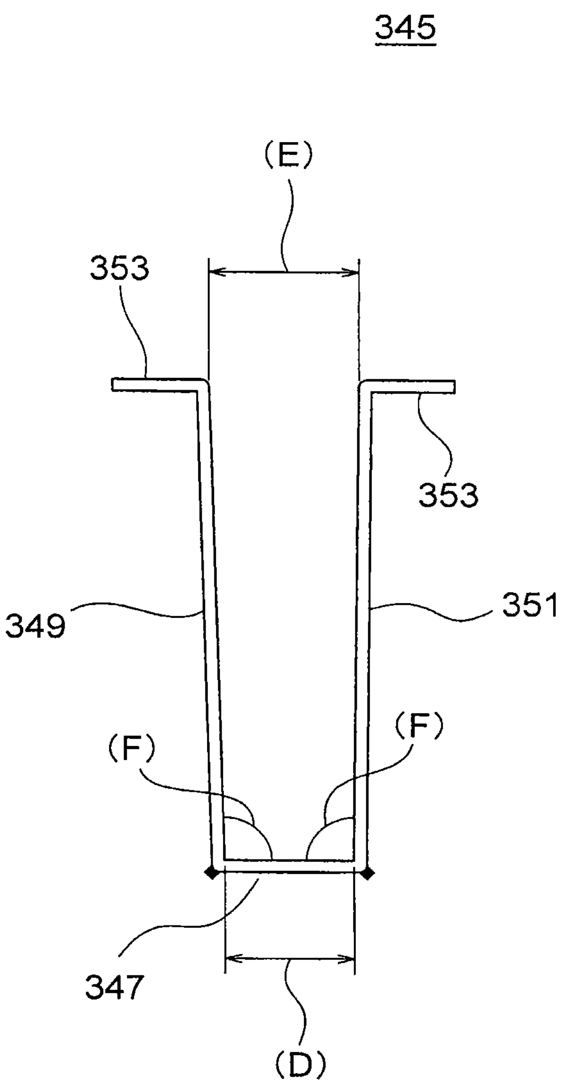
FIG. 13 is an end view illustrating a rail-like component according to the fourth embodiment of the present invention.

A rail-like component 345 is a steel component having a thickness of about 1.0 mm to 1.6 mm. The rail-like component 345 is arranged at a lower portion of the balustrade panel 9 over the entire length of the passenger conveyor. As illustrated in FIG. 13, the rail-like component 345 includes a bottom wall 347 to be brought into contact with the bottom surface 19 of the recessed portion 13 of the holder body 3, a side wall 349 to be brought into contact with the panel receiving surface 15, a side wall 351 to be brought into contact with the panel-side pressing surface 23, and at least one edge surface 353 for supporting a deck board described later. In other words, the rail-like component 345 is a member having an upwardly open groove defined by the bottom wall 347 and the pair of side walls 349 and 351, for receiving the balustrade panel 9.

The edge surface 353 is apart to be used for reinforcing the deck board described later. In this embodiment, the edge surfaces 353 are formed in pairs, and extend outwardly from upper ends of the corresponding side walls 349 and 351, respectively.

As illustrated in the end view of FIG. 13, the bottom wall 347 and the pair of side walls 349 and 351 define a C-shape opened upwardly. Further, under a natural state illustrated in FIG. 13, a width between the upper ends of the pair of side walls 349 and 351 under the natural state, that is, an opening width (E) is set slightly larger than an inner upper surface width (D) of the bottom wall 347. This is because an angle (F) formed between the bottom wall 347 and the side wall 349 and an angle (F) formed between the bottom wall 347 and the side wall 351 are slightly larger than 90°.

As described above, under the natural state, upper surface width (D)<opening width (E), but when the clamping force applying mechanism 7 is operated in use so as to sandwich the balustrade panel 9 between the holder body 3 and the clamping component 5, the rail-like component 345 is elastically deformed, and hence the upper opening is slightly narrowed, with the result that upper surface width (D)=opening width (E).

Figure 14:
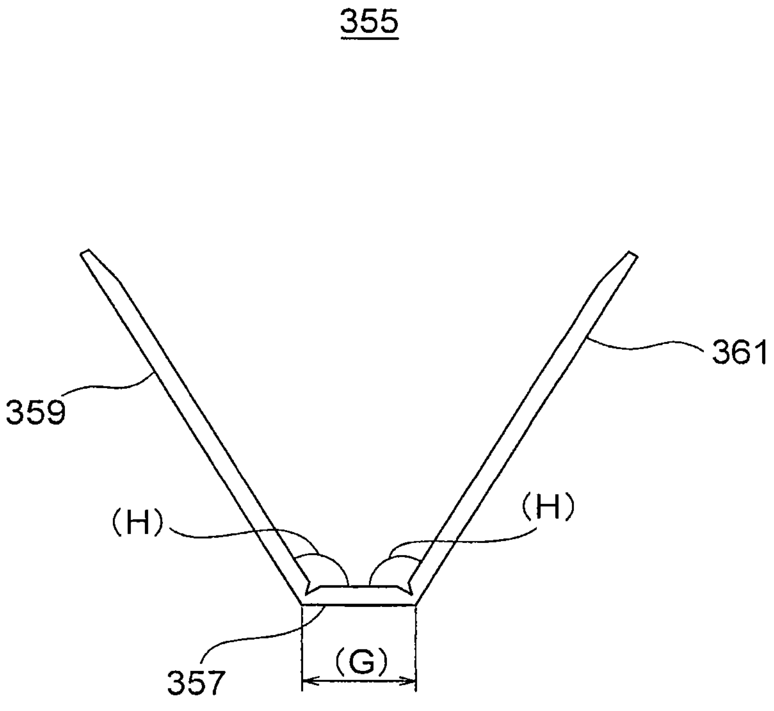
FIG. 14 is an end view illustrating a cushioning member according to the fourth embodiment of the present invention.

As illustrated in FIG. 14, under a natural state, a cushioning member 355 has a substantially V-shaped end surface in which the bottom portion is wide and flat to some extent. The cushioning member 355 includes a bottom wall 357, and a pair of side walls 359 and 361 extending from both ends of the bottom wall 357. Note that, the cushioning member 355 is not limited to the example illustrated in FIG. 14 as long as the cushioning member 355 includes a pair of side walls capable of changing an interval and an angle therebetween under the natural state and the assembled state.

Further, the cushioning member 355 is a soft resin molded product, and is larger in length than the holder body 3 by about 10 mm to 20 mm. When the cushioning member 355 is received in the recessed portion 13 as described later, the cushioning member 355 has a height substantially equal to that of the panel receiving surface 15 and sufficiently smaller than that of the rail-like component 345.

Still further, an outer lower surface width (G) of the bottom wall 357 of the cushioning member 355 is substantially equal to the inner upper surface width (D) of the bottom wall 347 of the rail-like component 345, that is, "outer lower surface width (G)"="inner upper surface width (D)"="thickness of balustrade panel 9+total thickness of pair of side walls 359 and 361 of cushioning member 355." In this manner, the width and height of the cushioning member 355 are set to such a size that the cushioning member 355 may exactly be received on an inner side of the rail-like component 345.

Still further, under the natural state, an angle (H) formed between the bottom wall 357 and each of the side walls 359 and 361 of the cushioning member 355 is set considerably larger than 90°. Under a state in which the cushioning member 355 is elastically deformed and arranged on the inner side of the rail-like component 345, the cushioning member 355 adheres to the inner side of the rail-like component 345 due to a restoring force.

Figure 15:
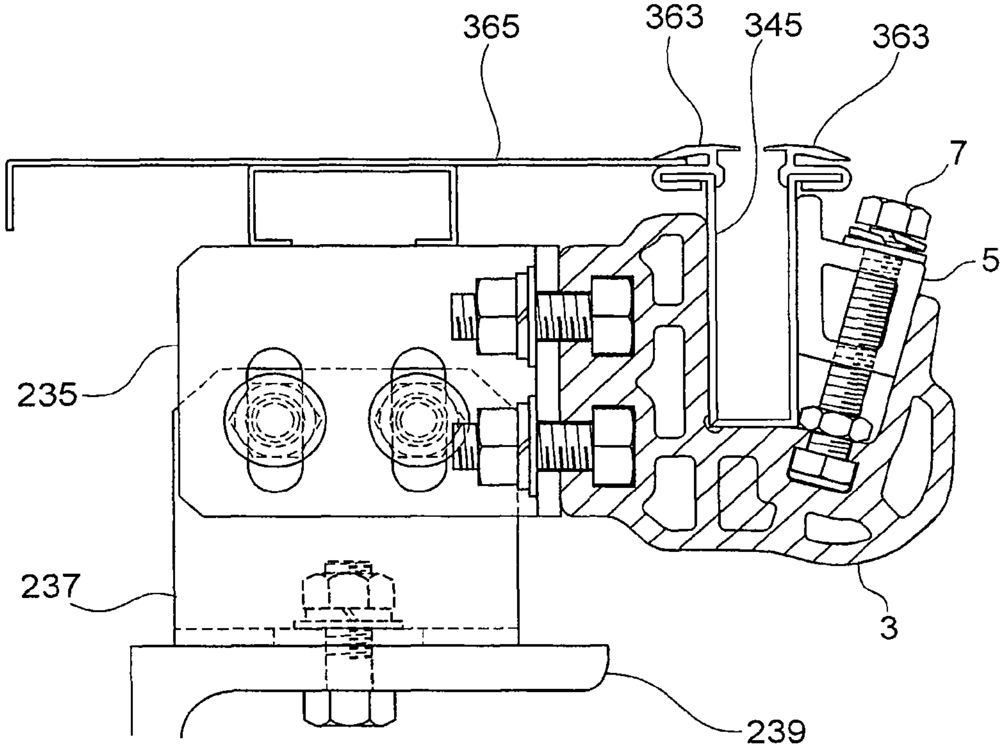
FIG. 15 is a view illustrating a procedure of assembling the balustrade device for a conveyor according to the fourth embodiment of the present invention.

Next, referring to FIGS. 15 to 18, description is given of a procedure of assembling the balustrade device for a conveyor according to the fourth embodiment. Firstly, as a preparatory stage in advance, a state as illustrated in FIG. 15 is attained in a plant or a work site if necessary. That is, the holder body 3 is fixed to the truss structure 239 through an intermediation of the adjusting bracket 235 and the mounting bracket 237, and the clamping component 5, the clamping force applying mechanism 7, and the rail-like component 345 are arranged in the recessed portion 13 of the holder body 3.

Note that, at this stage, the clamping force applying mechanism 7 is sufficiently loosened so as to raise the position of the clamping component 5 to an upper side of the recessed portion 13. Further, the rail-like component 345 at this time is slightly opened under the natural state as described above, and hence the clamping component 5 is lightly sandwiched between the rail-like component 345 and the clamping component-side abutment surface 17 of the holder body 3. Thus, even without any special support, the position of the clamping component 5 is prevented from being lowered due to the self-weight.

Further, at this stage, packings 363 are fixed to the pair of the edge surfaces 353 of the rail-like component 345, respectively. Still further, an outer deck 365 is fixed to one of the packings 363, and an inner deck (not shown) is finally fixed to the other of the packings 363.

Figure 16:
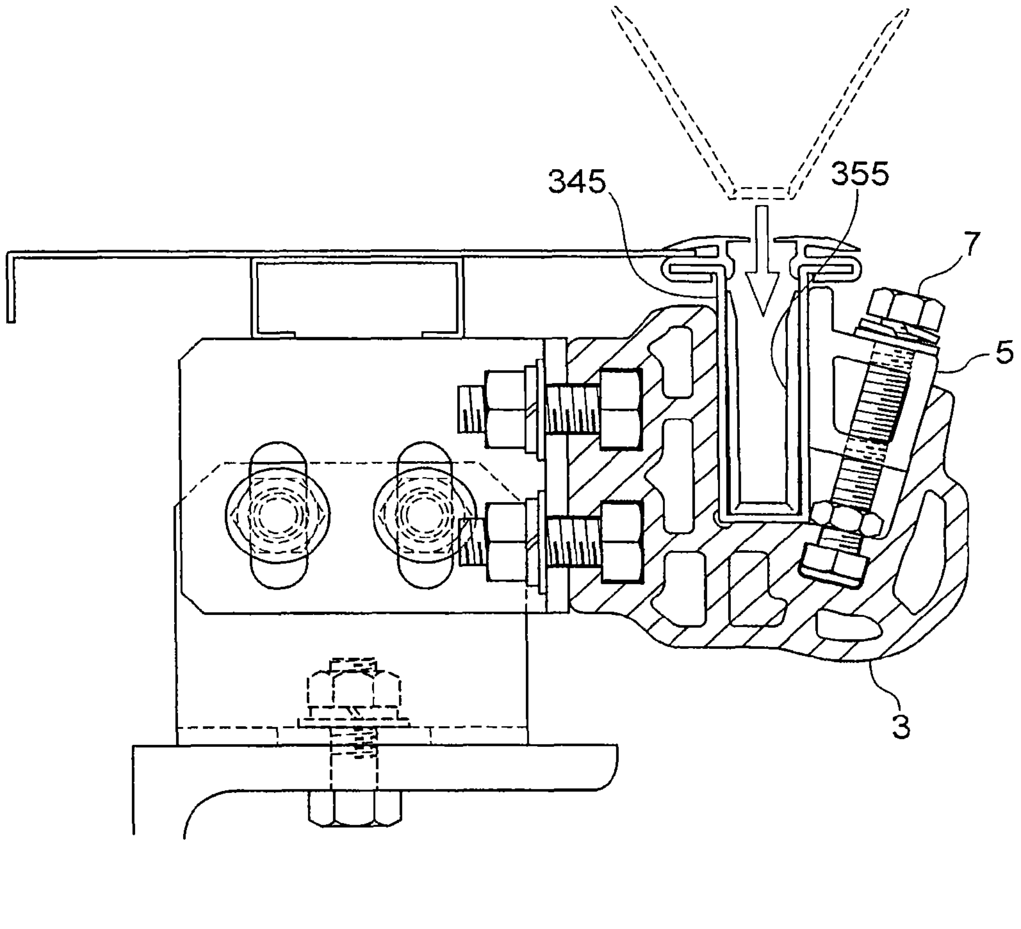
FIG. 16 is a view illustrating the procedure of assembling the balustrade device for a conveyor according to the fourth embodiment of the present invention.

Then, as a first stage, as illustrated in FIG. 16, the cushioning member 355 is inserted to the inner side of the rail-like component 345. At this time, the rail-like component 345 is opened wider than at the time of panel supporting operation, and hence the opening portion of the rail-like component 345 becomes slightly wider than the bottom surface. The cushioning member 355 is elastically deformed and inserted through the relatively wider opening portion so that the opening of the pair of side walls 359 and 361 is narrowed. The cushioning member 355 thus inserted adheres to the inner surface of the rail-like component 345 due to the restoring force of the cushioning member 355 to be opened on the inner side of the rail-like component 345.

Figure 17:
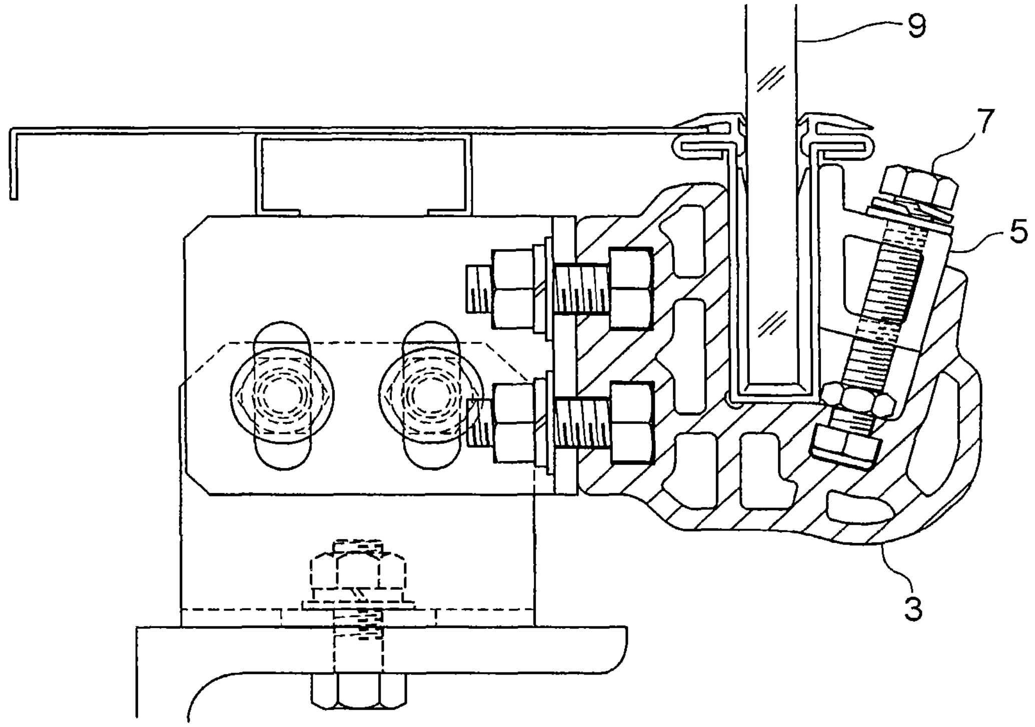
FIG. 17 is a view illustrating the procedure of assembling the balustrade device for a conveyor according to the fourth embodiment of the present invention.

Subsequently, as a second stage, as illustrated in FIG. 17, the balustrade panel 9 is inserted to the inner side of the cushioning member 355 arranged in the rail-like component 345. In this state, the clamping force applying mechanism 7 is still loosened, and hence the balustrade panel 9 is slightly movable between the holder body 3 and the clamping component 5, thereby being capable of desirably adjusting the inclination, the position in the height direction, the position in the longitudinal direction, and the like. Note that, the rail-like component 345 and the cushioning member 355 described above are interposed between the balustrade panel 9 and the holder body 3 and between the balustrade panel 9 and the clamping component 5, and hence, even when the worker releases his/her hands, the balustrade panel 9 does not wobble significantly so that the balustrade panel 9 stands by itself in a substantially constant state. This leads to the fact that fine adjustment of the position and posture of the balustrade panel 9 can be carried out safely, easily, and reliably.

Figure 18:
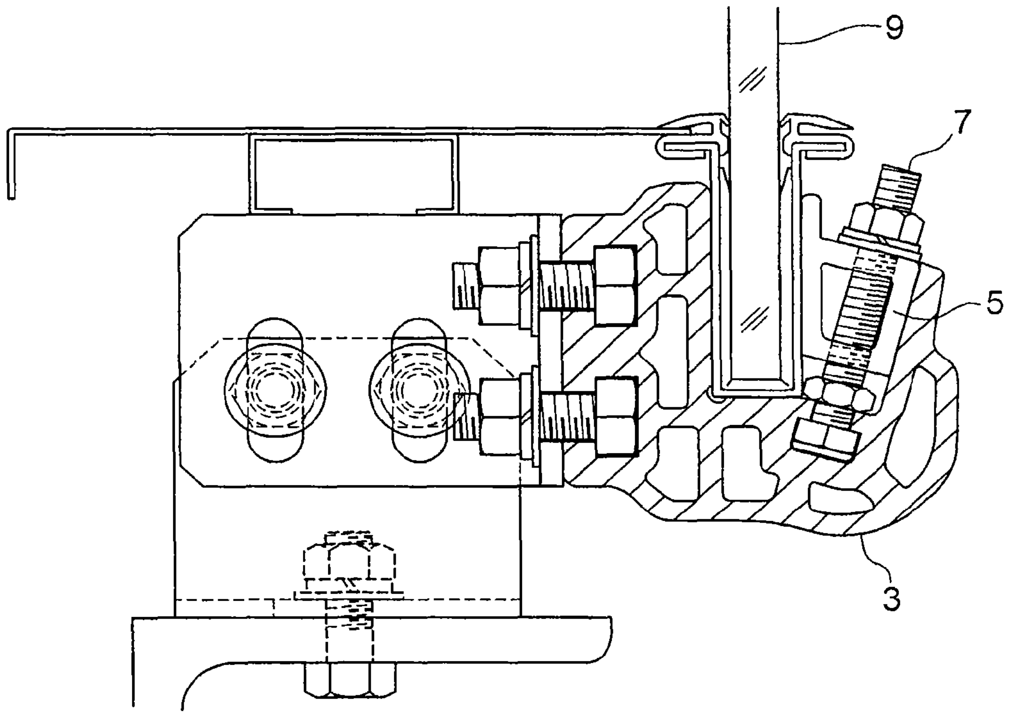
FIG. 18 is a view illustrating the procedure of assembling the balustrade device for a conveyor according to the fourth embodiment of the present invention.

Finally, as a third stage, as illustrated in FIG. 18, the clamping force applying mechanism 7 is operated so as to cause the clamping component 5 to apply a clamping force. Thus, the position of the clamping component 5 is lowered, and the rail-like component 345 and the cushioning member 355 are deformed, with the result that the balustrade panel 9 is fixed securely.

With the above-mentioned balustrade device for a conveyor according to the fourth embodiment, in addition to the above-mentioned functions of the first to third embodiments, the balustrade panel can be fixed easily and highly accurately. Further, the rail-like component is arranged at the lower end of the balustrade panel over the entire length, which leads to an advantage in that, even if the balustrade panel is broken, the broken pieces of the panel can be prevented from falling into the devices of the passenger conveyor.

Fifth Embodiment

Figure 19:
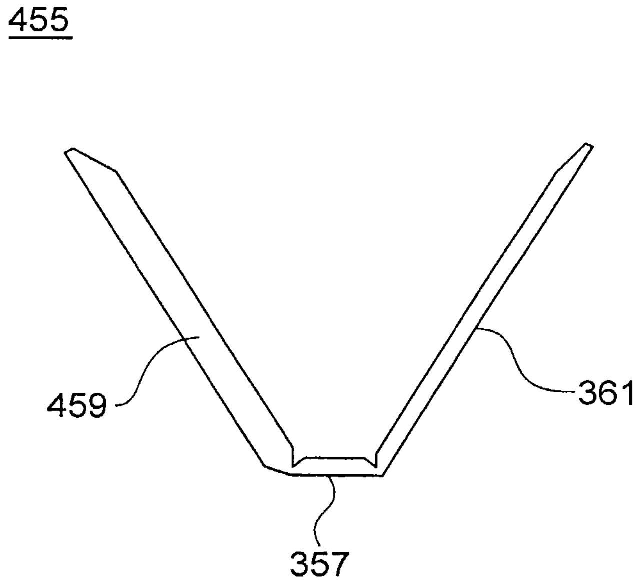
FIG. 19 is a view illustrating a fifth embodiment of the present invention in the same manner as that of FIG. 14.

Next, referring to FIG. 19, a balustrade device for a conveyor according to a fifth embodiment of the present invention is described. FIG. 19 is a view illustrating the fifth embodiment in the same manner as that of FIG. 14. In the fifth embodiment, the structure of the cushioning member according to the fourth embodiment is changed as described below.

As illustrated in FIG. 19, in a cushioning member 455, the side wall 361 on the inner side (step side), which is the clamping component 5 or 105 side, is formed at a similar thickness to that in the above-mentioned fourth embodiment, and a side wall 459 on the outer side, which is the panel receiving surface 15 side, is formed thicker or thinner than the side wall 361. Note that, FIG. 19 illustrates an example of a thick side wall 459. That is, the two surface parts of the cushioning member 455 for covering the side surfaces of the balustrade panel 9 are required to have a thickness that exactly fills the space between the lower end of the balustrade panel 9 and the rail-like component 345. Therefore, a plurality of types of thickness are prepared for the side wall 459 of the cushioning member 455, and the thickness is selected depending on the thickness of the balustrade panel 9 to be used.

With the above-mentioned balustrade device for a conveyor according to the fifth embodiment, the following advantages are attained in addition to the above-mentioned functions of the first to fourth embodiments. For example, even when a balustrade panel set to high-strength specifications and therefore thicker than a standard balustrade panel is to be fixed as well as the balustrade panel set to the standard specifications, it is only necessary to change the cushioning member and prepare only one type for the other components. Thus, it is unnecessary to change the components, set dimensions, and assembly procedures. Further, even when it is desired to change the thickness of only a balustrade panel at a specific position in the same passenger conveyor, the balustrade panel may be fixed through the change and selection of the corresponding cushioning member. Still further, in some specifications of the passenger conveyor, a stainless steel panel is used as well as the glass balustrade panel, and hence the internal structure is different from that of the glass type in the related art. In this embodiment, however, a cushioning member having a predetermined thickness conforming to the stainless steel panel is used, and thus the present invention can be carried out by using the structure of the glass type in other positions.

The details of the present invention have been described above specifically with reference to the preferred embodiments, but it is apparent that a person skilled in the art may employ various modifications based on the basic technical thoughts and teachings of the present invention.

For example, the present invention is not limited to the escalator as the passenger conveyor, but is also applicable to a moving walkway. Further, the present invention is not limited to the application to the conveyor configured to convey passengers, but may widely be applicable to a conveyor configured to convey other objects than people.

Reference Signs List

1, 101, 201, 301 balustrade device for conveyor, 3, 103 holder body, 5, 105 clamping component, 7 clamping force applying mechanism, 9 balustrade panel, 13 recessed portion, 23 panel-side pressing surface, 25 holder body-side abutment surface, 235 adjusting bracket, 237 mounting bracket, 241 elongate hole, 345 rail-like component

The invention claimed is:

1. A balustrade device for a conveyor, comprising:

a holder body;

a clamping component assembled to the holder body; and a clamping force applying mechanism, the clamping component having a panel-side pressing surface, the clamping force applying mechanism having a clamping force action axis intersecting, in vertical cross-sectional view, with the panel-side pressing surface or a plane extending from the panel-side pressing surface, wherein the clamping force action axis intersects with the panel-side pressing surface or a plane extending from the panel-side pressing surface at an angle from 10° to 30°.

2. A balustrade device for a conveyor according to claim 1, wherein the holder body has a recessed portion formed therein, for receiving the clamping component, wherein the clamping component has the panel-side pressing surface and a holder body-side abutment surface at both side portions thereof, wherein the panel-side pressing surface and the holder body-side abutment surface have a relationship of being inclined with respect to each other so as to gradually reduce an interval therebetween toward a bottom portion side of the recessed portion, and wherein the clamping force action axis of the clamping force applying mechanism extends, in vertical cross-sectional view, between the panel-side pressing surface and the holder body-side abutment surface.

3. A balustrade device for a conveyor according to claim 1, further comprising an adjusting bracket and a mounting bracket arranged between a fixing member of the conveyor and the holder body, wherein the adjusting bracket and the mounting bracket are connected to each other, wherein the adjusting bracket is further connected to the holder body, wherein the mounting bracket is further connected to the fixing member, wherein the adjusting bracket and the mounting bracket are connected to each other through use of a fastener passing through an elongate hole so that slide and rotation between the adjusting bracket and the mounting bracket are adjustable, and wherein the mounting bracket and the fixing member are connected to each other through use of a fastener passing through an elongate hole so that slide and rotation between the mounting bracket and the fixing member are adjustable.

4. A balustrade device for a conveyor according to claim 1, further comprising:

a rail-like component arranged between a panel receiving surface of the holder body and the panel-side pressing surface of the clamping component; and a cushioning member arranged on an inner side of the rail-like component, wherein the balustrade device is configured to hold a balustrade panel on an inner side of the cushioning member.

5. A balustrade device for a conveyor according to claim 4, wherein the cushioning member comprises a pair of side walls capable of changing an interval and an angle therebetween under a natural state and an assembled state, and wherein one of the pair of side walls is different in thickness from another of the pair of side walls.

* * * * *